United States Patent [19]
Shioda et al.

[11] Patent Number: 5,537,393
[45] Date of Patent: Jul. 16, 1996

[54] BLSR NETWORK HAVING PATH-AIS GENERATION FUNCTION

[75] Inventors: Masahiro Shioda; Daisuke Maruhashi, both of Kawasaki, Japan

[73] Assignee: Fujitsu Limited, Kanagawa, Japan

[21] Appl. No.: 359,903

[22] Filed: Dec. 20, 1994

[30] Foreign Application Priority Data

Mar. 17, 1994 [JP] Japan ................................. 6-047219

[51] Int. Cl.⁶ ................................................ H04L 12/437
[52] U.S. Cl. ...................... 370/16.1; 370/55; 370/85.12; 371/20.6; 359/119
[58] Field of Search .................................. 370/13, 14, 15, 370/16, 16.1, 55, 85.12; 371/8.2, 11.2; 359/119, 137

[56] References Cited

U.S. PATENT DOCUMENTS

| | | | |
|---|---|---|---|
| 4,835,763 | 5/1989 | Lau | 370/16 |
| 4,965,790 | 10/1990 | Nishino et al. | 370/85.12 |
| 5,003,531 | 3/1991 | Farinholt et al. | 370/16.1 |
| 5,278,824 | 1/1994 | Kremer | 370/15 |
| 5,365,510 | 11/1994 | Nicholson et al. | 370/16 |
| 5,406,401 | 4/1995 | Kremer | 370/15 X |
| 5,412,652 | 5/1995 | Lu | 370/85.12 |

*Primary Examiner*—Douglas W. Olms
*Assistant Examiner*—Russell W. Blum

[57] ABSTRACT

A bidirectional line switched ring network having a path alarm indication signal (AIS) generation function, which is provided with ID writing means for writing, in the path overhead bytes of frames, IDs preassigned to add side nodes, tables for holding the correspondence between the IDs of add side nodes for sending frames to be dropped at drop side nodes and the number of the time slots to be used for the transmission of the frames, comparing means for comparing the IDs of the add side nodes read from the received path overhead bytes and the IDs in the tables corresponding to the number of the time slots used by the received frames, and path alarm indication signal generation means for generating and sending a path alarm indication signal (AIS) when the result of the comparison is that the two IDs do not match. By this, a path alarm indication signal can be generated at a high speed at the time of erroneous channel connection by simple hardware and a simple procedure.

9 Claims, 8 Drawing Sheets

BLSR NETWORK HAVING PATH-AIS GENERATION FUNCTION

BACKGROUND OF THE INVENTION

1. Field of the Invention

The present invention relates to a bidirectional line switched ring (BLSR) network, more particularly relates to a function of generating a path alarm indication signal (AIS) essential for that network.

One of the so-call synchronous digital hierarchy networks (SDH) now being established as a standard in North America is the SONET (synchronous optical network) system. In a ring network of the SONET system, optical fibers are paired to form a ring. One of the two optical fibers is used to perform data transmission in the clockwise direction, while the other is used to perform data transmission in the counterclockwise direction. The standard calls for each optical fiber to include working line time slots and protection line time slots. When a line disconnection or other failure occurs, the working line time slots of one optical fiber are looped back to the protection line time slots of the other optical fiber so as to restore the line and maintain communication in the ring network.

In recent years, there has been a demand in digital optical communication networks for improvement of the rate of line use and the rate of line recovery due to the increased volume of transmission. The BLSR network has been developed in answer to that demand.

In a ring network, for example, data is transferred in units of frames called synchronous transport signals-1 (STS-1). An STS-1 frame is divided roughly into overhead (OH) bytes and data conveyor bytes known as the synchronous payload envelope (SPE).

When some sort of transmission failure occurs in the ring network, an STS-1 frame is transmitted converted to a path-AIS so as to inform the low order group side of the failure. A path-AIS corresponds to the data conveyor bytes in the STS-1 frame rewritten to all "1" data. Accordingly, this path-AIS plays the important role to reduce the impact of the transmission failure to a minimum.

2. Description of the Related Art

As will be explained later in more detail with reference to the drawings, according to the related art, it was necessary to provide each node with maps for the path-AIS generation function. The first problem therefore was that the hardware, in particular the memory, became large in size due to the fact that there were as many as 16 nodes requiring maps and it was necessary to provide each with table information, comprised of 48 channels' (48 time slots') worth of combinations in the case of for example an optical carrier (OC)-48 transmission mode.

Further, the standard calls for the line switching to be completed within 50 ms when a usual loopback switching is to be carried out, and also within 100 ms when an erroneous channel connection occurs and the path-AIS is to be inserted, but if the central processing unit (CPU) has to perform software processing referring to the above-mentioned huge amount of table information, a considerably long time would end up being required until the command for generation of the path-AIS could be issued. That is, there was the second problem of a large time lag until the issuance of the command for generation of the path-AIS.

SUMMARY OF THE INVENTION

The present invention was made in consideration of the above problems and has as its object the provision of a BLSR network having a path-AIS generation function which enables a path-AIS to be generated at a high speed by a simple procedure using a simple hardware configuration at the time when an erroneous channel connection occurs.

Figure 3:
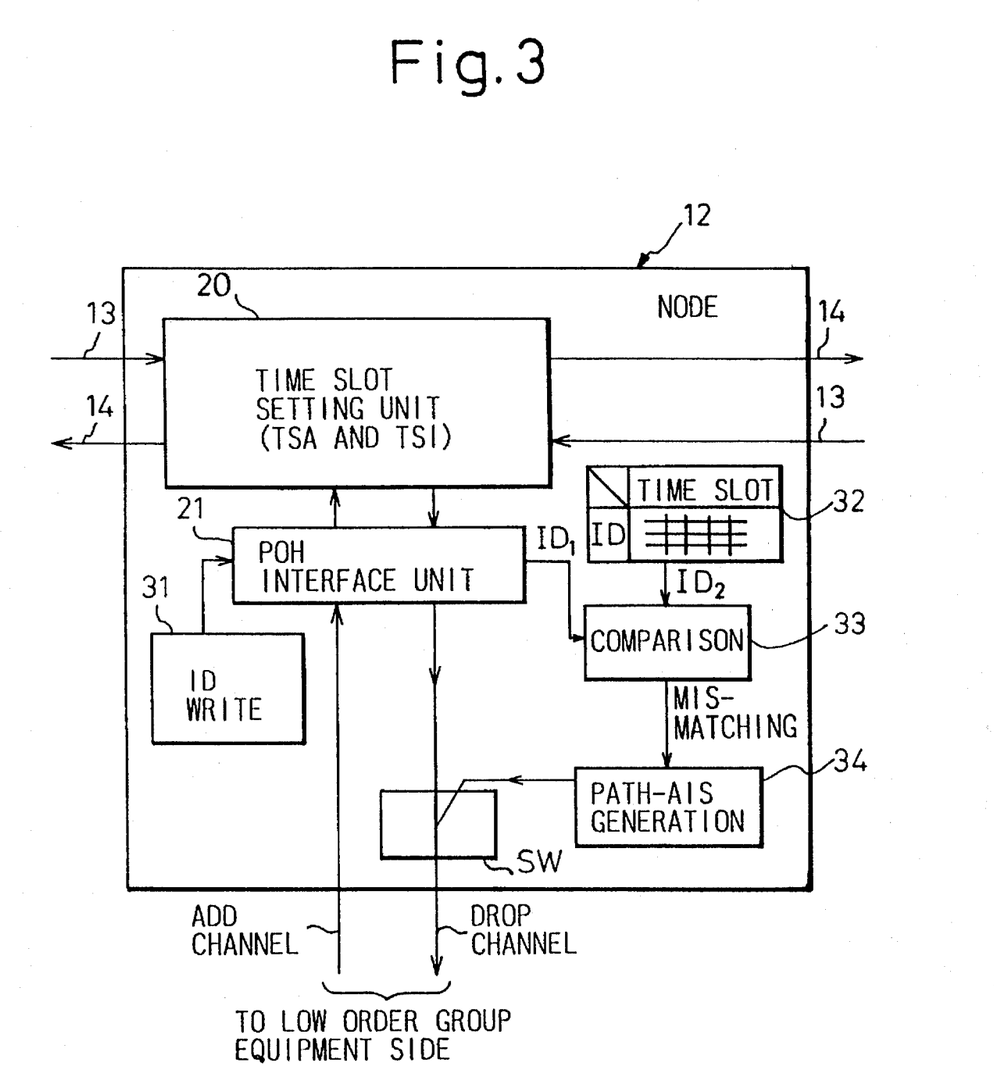
FIG. 3 is a view of the basic configuration of a BLSR network according to the present invention.
Figure 7:
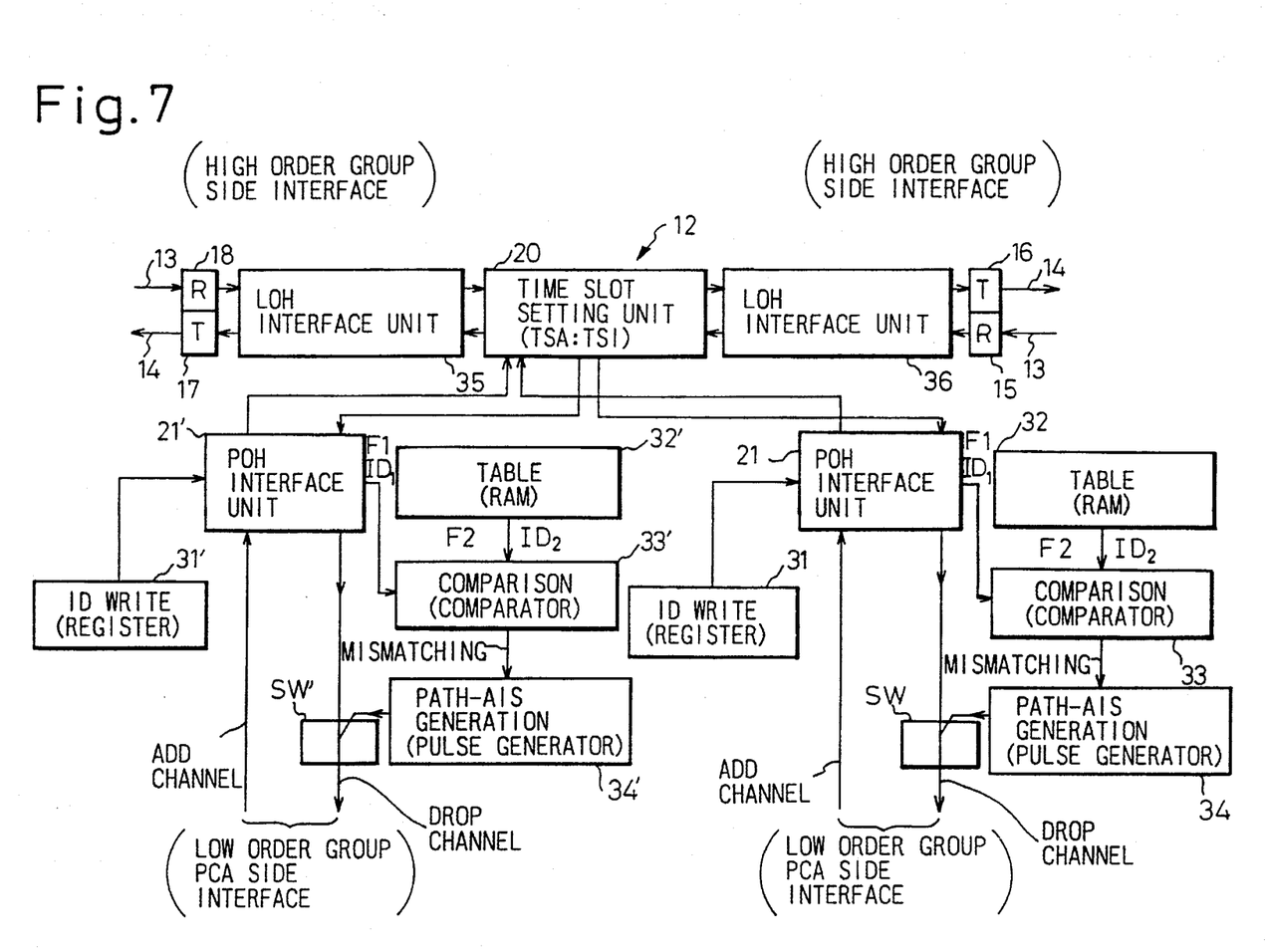
FIG. 7 is a view of a configuration able to handle even erroneous connection to a PCA channel.

To attain the above object, the present invention is comprised of ID writing means (31, 31') for writing, in the path overhead bytes of frames, the IDs preassigned to add side nodes, tables (32, 32') for holding the correspondence between IDs of add side nodes for sending frames to be dropped at drop side nodes and the number of the time slots to be used for the transmission of the frames, comparing means (33, 33') for comparing the IDs of add side nodes read from the received path overhead bytes and the IDs in the tables (32) corresponding to the number of the time slots used by the received frames, and path-AIS generation means (34, 34') for generating and sending a path-AIS when the result of the comparison is that the two IDs do not match. By this, a path-AIS is generated at a high speed at the time of erroneous channel connection by simple hardware and a simple procedure.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
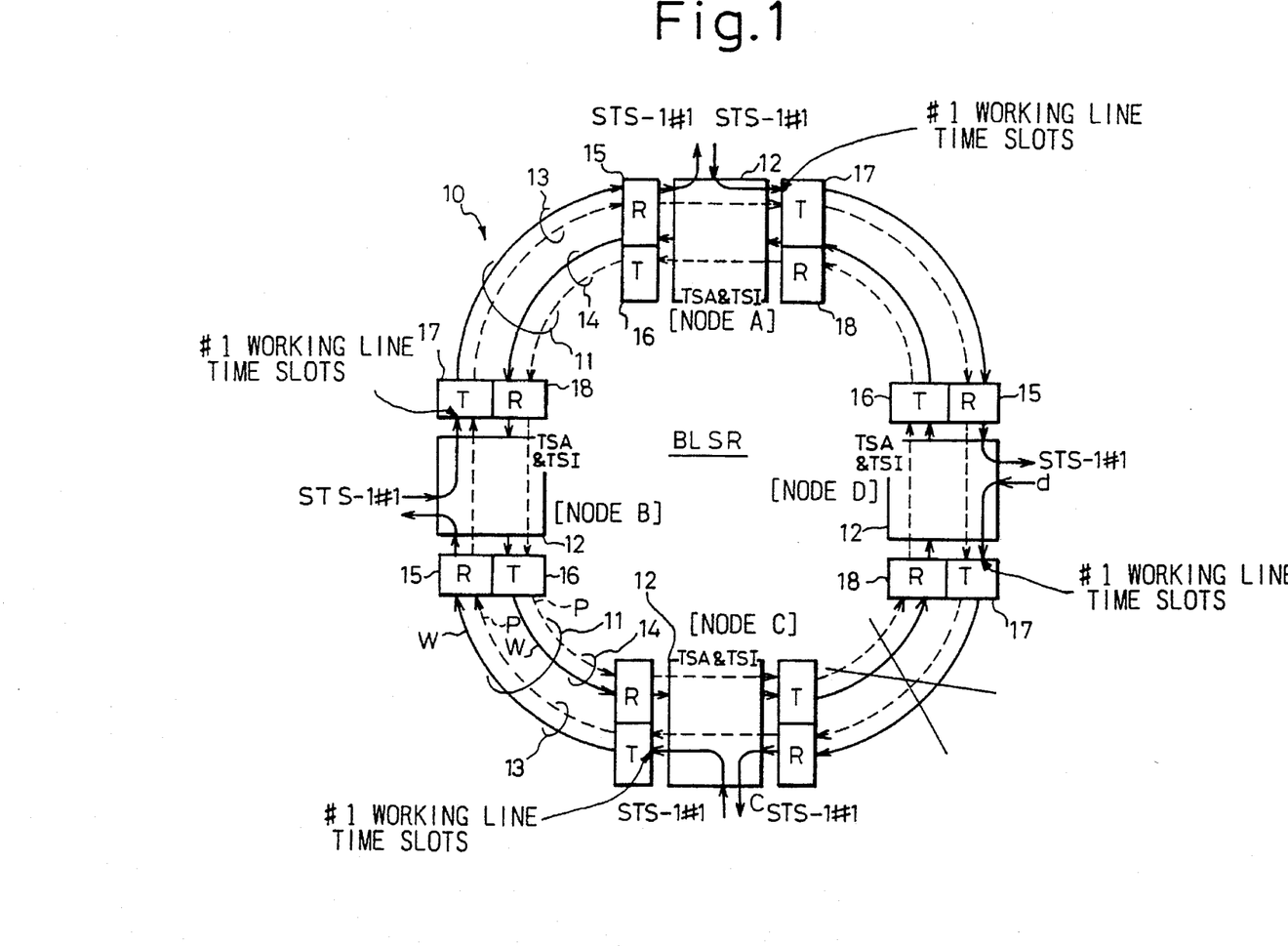
FIG. 1 is a view of a first example of line usage in a BLSR network.

FIG. 1 is a view of a first example of line usage in a BLSR network. In the figure, 10 shows the BLSR network as a whole. The BLSR network 10 is mainly comprised of an optical ring transmission line 11 and a plurality of nodes 12. In the figure, for simplification, four nodes (A, B, C, and D) 12 are shown.

The optical ring transmission line 11 has a bidirectional construction which enables bidirectional line switching, allots a channel to each of the plurality of time slot groups, and sends frames (STS-1) for each channel.

The plurality of nodes 12 are inserted at predetermined intervals in the optical ring transmission line 11. Each accommodates under it low order group equipment (not shown) and performs add and drop operations of frames (STS-1) of the channels between the low order group equipment and the optical transmission line 11. Each node 12 generates the above-mentioned path-AIS and sends it to the line when detecting a transmission failure. Note that in the present invention, the nodes generate a path-AIS when erroneous channel connection occurs at a working line, convert the frames belonging to the channel with the erroneous connection to the path-AIS, and send the same on to the low order group equipment side. The erroneous channel connection will be explained in more detail later.

Referring again to FIG. 1, the optical ring transmission line 11 has a first optical fiber 13 comprised of a pair of optical fibers for transmission in the clockwise direction and a second optical fiber 14 similarly comprised of optical fibers for transmission in the counterclockwise direction.

The optical signal from the first optical fiber 13 is received by an optical receiver (R) 15, while the optical signal input to the first optical fiber 13 is output from an optical transmitter (T) 16.

Here, the first and second optical fibers 13 and 14 are divided into a path W (working) over which the working line time slots flow and a path P (protection) over which the protection line time slots flow.

Each node 12 is comprised mainly of a time slot assignment (TSA) and a time slot interchange (TSI). The TSA is mounted at the low order group equipment side and performs an add and drop operation of transmission data. The TSI is inserted in series in the path and performs rearrangement of the time slots. In the time slot group, for example, in the case of an OC-48 transmission mode, the time slots #1 to #24 are allotted for the path W, while the time slots #25 to #48 are allotted for the path P. The time slots correspond to the channels. Note that in the figure, only STS-1 #1 is shown, but in actuality STS-1 #1 to STS-1 #48 are multiplexed.

Next, an explanation will be made of the above-mentioned erroneous channel connection. First, assume that a transmission failure (line disconnection) has occurred at the location marked by the large X in FIG. 1. If so, then loopbacks are formed by the nodes 12 at the two ends of the location of the failure, that is, the node (C) 12 and the node (D) 12. Due to this, the transmission data which at normal times had been sent clockwise from the point d of the node D and the point c of the node C through the path W of the first optical fiber 13 is sent counterclockwise through the path P in the second optical fiber 14 by the loopback after the occurrence of the failure and reaches the point c of the node C. This enables the line to be restored.

Assume, however, that a second line failure (line disconnection) occurs after the line is being restored by the loopback. If this happens, then the above erroneous channel connection will occur. This will be explained referring again to the figures.

Figure 2:
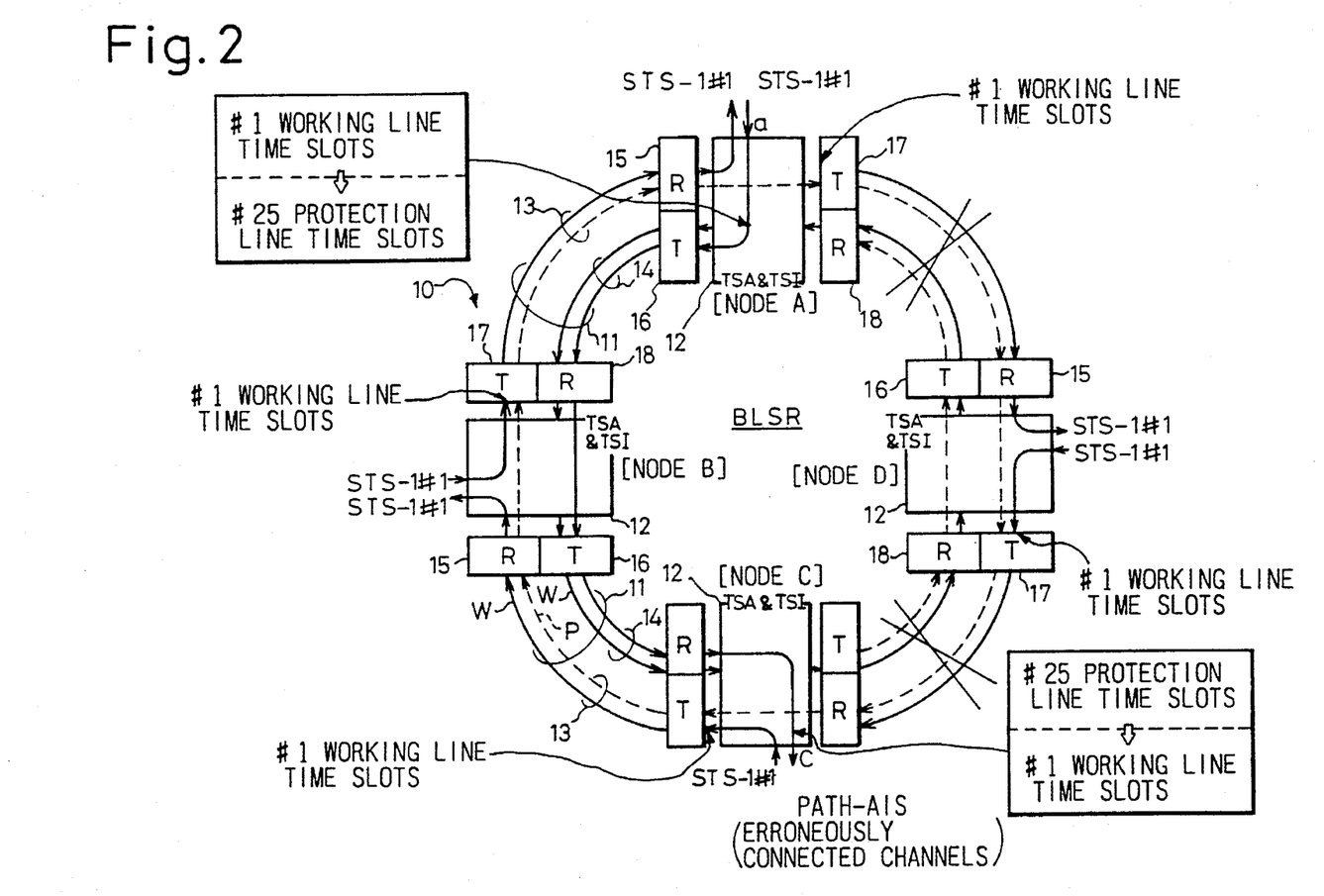
FIG. 2 is a view of a second example of line usage in a BLSR network.

FIG. 2 is a view of a second example of line usage in a BLSR network. As shown in this figure, a further transmission failure occurs between the node (A) 12 and the node (D) 12. Due to this, loopbacks are formed by the node A and the node D. Note that the node D is then isolated from the network as a result.

Assume however that up to just before the second transmission failure occurred, data (STS-1 #1) was being transmitted in the counterclockwise direction from the point a of the node A to the point c of the node C through the path W of the second optical fiber 14. If the second transmission failure occurs and the loopback is formed at the node A under such circumstances, the data (STS-1 #1) is sent to the point c of the node C switched from the path W to the path P of the second optical fiber 14. Right up until the second transmission failure occurs, however, the data (STS-1 #1) from the point d of the node D is sent to the point c. Therefore, at the point c of the node C, the data (STS-1 #1) supplied from the point d of the node D is completely unintentionally switched to the data (STS-1 #1) from the point a of the node A. Viewed from the low order group end equipment side (for example, television set), the program of channel 1 which had been viewed ends up suddenly switched to channel 3. This is what is referred to as an erroneous channel connection.

The occurrence of such erroneous channel connection has naturally been envisioned. In the specification (TA-NWT-001230) of Bellcore (Bell Communication Research), it is required that frames (STS-1) be immediately sent out converted to the above-mentioned path-AIS when such an erroneous channel connection occurs at the BLSR network.

The following technique has been used in the related art for obtaining a path-AIS generation function for meeting this requirement. Each node 12 in the BLSR network 10 is provided with as many as 15 maps. Since the standard stipulates a maximum of 16 nodes able to be accommodated in a BLSR network, each node recognizes, on the above-mentioned 15 maps, the channel setting states of the other nodes (maximum 15). That is, information as to which node is connected to which node by the use of which channel is held at each map.

If a transmission failure occurs here and a loopback is formed, the channel setting states change, so the channel setting information is rewritten on the maps. Further, the CPU judges by software processing based on the rewritten channel setting state information if an erroneous channel connection might have occurred. Based on the results of this judgement, the operation for generating a path-AIS is activated at the nodes with a high possibility of occurrence of an erroneous channel connection.

According to the above conventional technique, however, the first problem mentioned earlier occurred. That is, it was necessary to equip each node with maps for the path-AIS generation function. The hardware, in particular the memory, became large in size due to the fact that there were as many as 16 nodes requiring maps and it was necessary to provide each with table information, comprised of 48 channels' (48 time slots') worth of combinations in the case of for example an OC-48 transmission mode.

Further, it gave rise to the second problem mentioned earlier, that is, the fact that the standard calls for the line switching to be completed within 50 ms when a usual loopback switching is to be carried out, and also within 100 ms when an erroneous channel connection occurs and the path-AIS is to be inserted, but if the central processing unit (CPU) had to perform software processing referring to the above-mentioned huge amount of table information, a considerably long time was required until the command for generation of the path-AIS could be issued. That is, there was a large time lag until the issuance of the command for generation of the path-AIS.

The present invention provides a BLSR network having a path-AIS generation function which enables a path-AIS to be generated at a high speed by a simple procedure using a simple hardware configuration at the time when an erroneous channel connection occurs.

Note that the above explanation was made with reference to just erroneous connection among working lines (path W), but completely the same type of erroneous connection may occur between a working line (path W) and a protection channel access (PCA) line (path P) as well (mentioned later). The present invention may be similarly applied to such erroneous connection to the PCA line.

FIG. 3 is a view of the basic configuration of a BLSR network according to the present invention. The nodes of the present invention have exactly the same constructions, so just one node is shown in the figure representing all the others. The main existing components of the node 12, that is, the TSA and TSI, are shown together as the time slot setting unit 20. At the time slot setting unit 20, transmission data is received from the first optical fiber 13 and the second optical fiber 14. This transmission data is relayed (through) and sent out to the optical fibers. Alternatively, the transmission data from the add channel is sent to the first optical fiber 13 or the second optical fiber 14. Conversely, part of the transmission data received from the first or second optical fiber is dropped and entered in the drop channel.

As mentioned earlier, the transmission data is for example assembled in units of STS-1 frames, each frame comprised of overhead (OH) bytes and data conveyor bytes SPE. In the present invention, use is made of the path overhead (POH) bytes among the various overhead bytes. In FIG. 3, the block 21 is a POH interface unit for terminating the path overhead (POH) bytes.

The blocks newly introduced in FIG. 3 according to the present invention are the ID writing means 31, the table 32, the comparing means 33, and the path-AIS generation means 34.

The ID writing means 31 is provided at add side nodes of frames (STS-1) and writes into the path overhead (POH) bytes in the frames the IDs preassigned to the add side nodes.

The table 32 is provided at drop side nodes of frames and holds a predetermined correspondence between the IDs of the add side nodes sending the frames to be dropped at drop side nodes and the number of the time slots used for the transmission of the frames (which time slot signals should come from which nodes).

The comparing means 33 is provided at drop side nodes of frames and compares the drop side node IDs ($ID_1$) read from the path overhead (POH) bytes in the received frames and the add side node IDs ($ID_2$) in the tables corresponding to the number of the time slots used by the received frames (#1 to #24 and #25 to #48).

The path-AIS generation means 34 generates a path-AIS and sends it to the low order group equipment side when the result of the comparison by the comparing means 33 is that two IDs do not match ($ID_1$ does not equal $ID_2$). At that time, the switch SW switches to the side for receiving the generated path-AIS.

Note that FIG. 3 does not differentiate between the add side nodes and drop side nodes and shows the same by a single node. This is because both nodes may be frame add side nodes or frame drop side nodes.

At the add channel side, the writing means 31 of FIG. 3 writes the ID of the related node in the path overhead bytes of the frame at the POH interface unit 21. The path overhead (POH) bytes are not accessed at all even by the time slot setting unit (TSA and TSI) of any node, so even if the above-mentioned loopback is performed, the channel is held as is without being rewritten until being dropped at the destination node.

At the destination node of the drop side, the ID which is held ($ID_1$) and the ID ($ID_2$) from the table 32 retrieved based on the channel (time slot) of the transmission data specified at the time of startup of the network (that is, the expected value) are compared. If not matching, an erroneous channel connection has occurred.

Therefore, a path-AIS generated by the path-AIS generation means 34 is sent through the switch SW to the low order group equipment side of the channel on which the erroneous channel connection has occurred. The path-AIS does not have any significant data, so no information is leaked to the mistakenly connected party.

Figure 4:
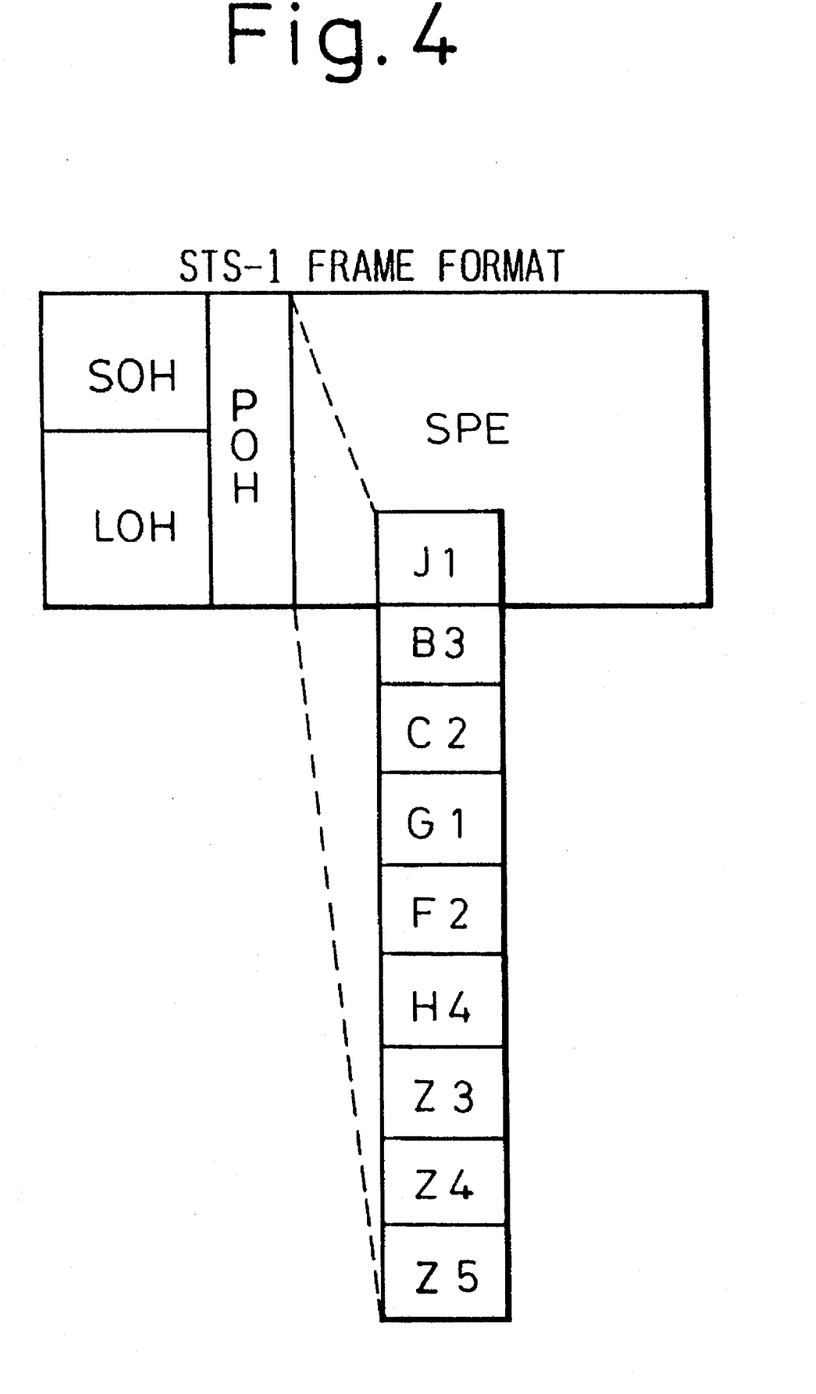
FIG. 4 is a view of the general format of a frame.

FIG. 4 is a view of the general format of a frame and shows, for example, the format of an STS-1 frame. In the figure, POH is the above-mentioned path overhead bytes used for the operation managing information of the network (in particular, the path (section) portion). In addition, the overhead bytes may include section overhead (SOH) bytes, line overhead (LOH) bytes, or, while not shown, transport overhead bytes.

SPE, as mentioned earlier, carries the transmission data actually to be transmitted and is filled with bits of "1" and "0". If the above-mentioned erroneous channel connection occurs, however, the path-AIS generation means 34 rewrites the SPE to all "1" and sends this to the switch SW.

Note that the path overhead POH bytes are comprised of the bytes J1, B3 ... Z4 and Z5 according to the standard.

Figure 5:
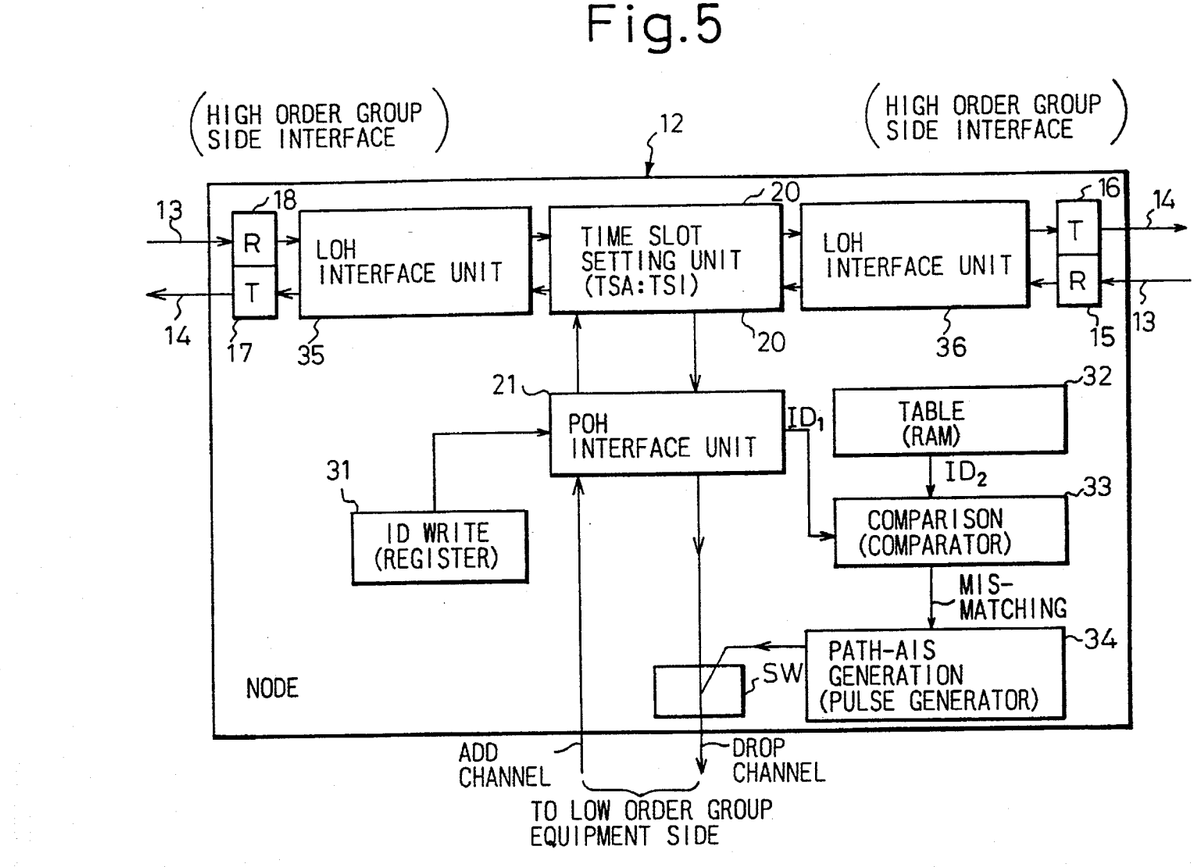
FIG. 5 is a view showing the configuration of FIG. 3 in more detail.

FIG. 5 is a view showing the configuration of FIG. 3 in more detail. Note that throughout all the figures, similar constituent elements are given the same reference numerals or symbols.

In the configuration of FIG. 5, the above-mentioned transmitters (T) 16 and 17, optical receivers (R) 15 and 18, and line overhead (LOH) interface units 35 and 36 are shown.

The constituent elements (31 to 34) according to the present invention may be realized by various methods. For example, the ID writing means 31 may be realized by a register storing certain codes, the table 32 may be realized by a RAM (or a ROM), the comparing means 33 may be realized by a digital comparator, and the path-AIS generation means 34 may be realized by a pulse generator. All of these can be realized by extremely inexpensive components.

Figure 6:
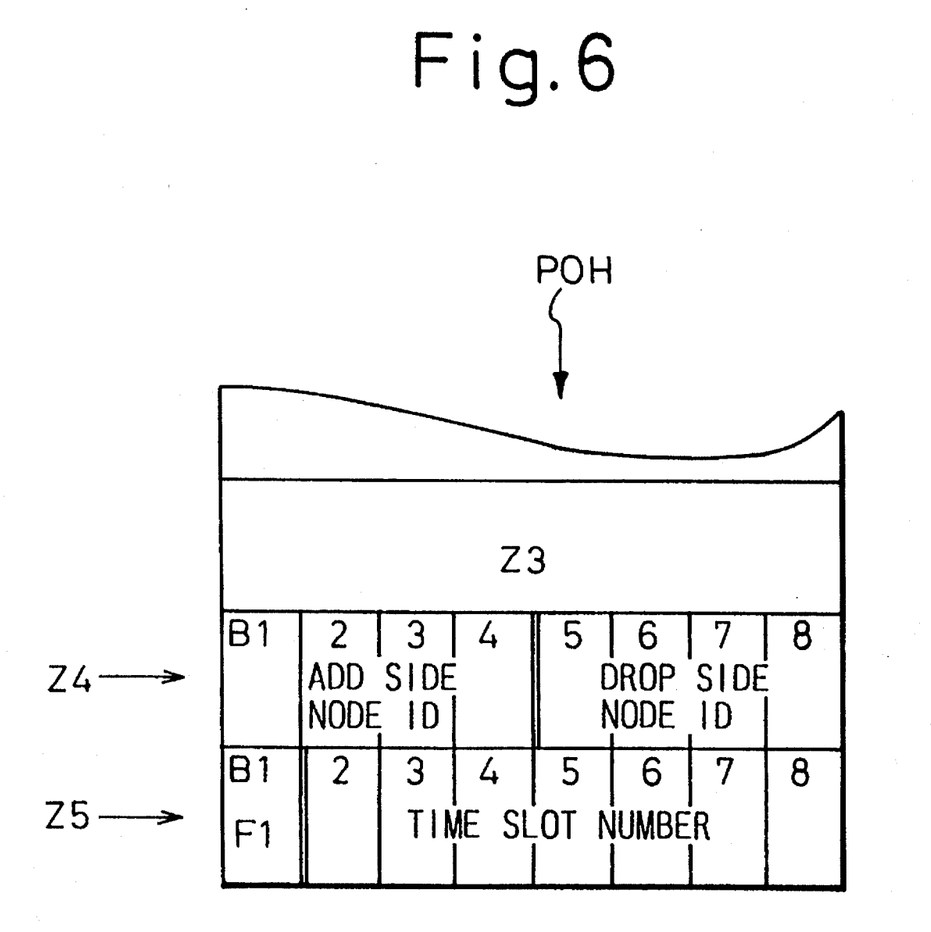
FIG. 6 is a view of part of the path overhead bytes.

FIG. 6 is a view of part of the path overhead bytes. According to the first embodiment of the present invention, the ID writing means 31 and comparing means 33 write and read the ID of the add side node to and from at least one of the Z4 byte and Z5 byte constituting the path overhead bytes. If the ID is to be written in the Z4 byte by the ID writing means 31, the comparing means 33 reads the ID from the Z4 byte. If the ID is to be written in the Z5 byte, the comparing means 33 reads the ID from the Z5 byte.

If it is required to write the ID in both of the Z4 byte and Z5 byte so as to improve the reliability, the ID is read from both of the Z4 byte and the Z5 byte.

No matter which of the Z4 byte and the Z5 byte is used, the ID information is placed in four consecutive bits among the eight bits (B1 to B8) constituting each of the bytes. The figure shows the case of placing the add side node ID at the bits B1 to B4 of the Z4 byte.

As mentioned already, there are as many as 16 nodes able to be accommodated in a single BLSR network, so four bits are sufficient for expressing the IDs for identifying each of the 16 nodes.

In this case, the remaining four bits (B5 to B8) are unused, so if necessary use may be made of the bits B5 to B8 as well. For example, it is possible to place the drop side node ID on them. In the unlikely event that the TSA malfunctions and drops a frame (STS-1) which should not be dropped, it is possible to discover the malfunction by matching with the bits B5 to B8.

Explaining the path overhead POH bytes in somewhat more detail, the POH bytes, as already explained (FIG. 4), are comprised of the bytes J1, B3, C2, C1, F2, H4, Z3, Z4, and Z5. Further, the roles of these bytes are defined by standards as well. JI is a path trace monitor, B3 a path error monitor, C2 a path signal label, G1 path status information, F2 a maintenance channel, and H4 an indicator byte of the TU (tributary unit) multiframe number. Right now, however, the Z3, Z4, and Z5 bytes have yet to be particularly defined and are so-called reserved bytes. Accordingly, placing the ID information in the Z4 byte or the Z5 byte as explained above poses no problem at all in the system operation.

An explanation will be given of a second embodiment below. The second embodiment makes use of the J1 byte (see FIG. 2) in the group of bytes constituting the path overhead POH bytes. As mentioned earlier, the J1 byte is a 64 Kbyte area defined as a "path trace monitor". The J1 byte originally includes at least address information corresponding to the add side node ID and address information corresponding to the drop side node ID, so by making use of this it is possible to equivalently write and read the desired add side node ID (if necessary, even the drop side node ID as well). However, the condition is that it be known in advance that the path overhead bytes will be terminated at the drop side node. This is because the desired function cannot be performed if the path overhead bytes are not terminated, but flow to the low order group equipment side as they are.

Next, an explanation will be given of a third embodiment. The third embodiment enables erroneous connection to a PCA line to be dealt with. A phenomenon similar to the erroneous channel connection spoken of in reference to the first and second embodiments occurs between a working line (path W) and PCA line (path P) as well. Usually a service is provided through the working line (path W), but in a BLSR network, it is also allowed to provide the service using the protection line (path P), that is, the time slots #25 to #48 in the case of an OC-48 transmission mode. A PCA service has the advantage of enabling data to be transmitted inexpensively, but when a transmission failure occurs, the data transmitted over the working line is given priority to by the loopback, so the transmission on the PCA line is suspended. Accordingly, the transmission by the PCA line is used for communication of data of a low priority.

In a BLSR network where the service by the PCA line and the service by the working line are provided simultaneously, if a double transmission failure such as shown in FIG. 2 occurs, then, referring to FIG. 2, (i) the low order group apparatus under the node (C) 12 receiving the service by the PCA line will find that the service is switched to a service by the working line provided to another subscriber or (ii) the low order group apparatus under the node (C) 12 receiving the service by the working line will find that the service is switched to a service by the PCA line provided to another subscriber.

These phenomena of (i) and (ii) are exhibited by an erroneous connection to the PCA line.

FIG. 7 is a view of a configuration able to handle even erroneous connection to the PCA line. To deal with the erroneous connection to the PCA line, a similar path overhead interface unit 21', ID writing means 31', table 32', comparing means 33', path-AIS generating means 34', and switch SW' are required at the PCA line side as well. These are connected through the low order group PCA side interface to the low order group equipment. Note that similar constituent elements as mentioned above (21, 31, 32, 33, 34, and SW) are connected to the low order group equipment through the low order group working line side interface.

In the end, the nodes 12 are further provided with the function of generating a path-AIS even when a PCA line executing a protection channel access (PCA) and using the protection line (path P) is erroneously connected to a working line by loopback due to occurrence of some failure. Here, provision is made of a PCA line side ID writing means 21' and comparing means 33' similar to the working line side ID writing means 21 and comparing means 33. These means perform writing and reading of a flag F1 showing if the PCA line is being used or not to and from at least one of the Z4 byte and Z5 byte constituting the path overhead bytes.

Further, the nodes 12 are provided with PCA line side tables 32 similar to the working line side table 32. These tables hold the correspondence between the add side node IDs and flags F2 showing if the add side nodes are using the PCA line or not.

The comparing means 33 and 33' of the working line side and the PCA line side compare the flag F1, read from the overhead POH bytes in the received frame (STS-1), indicating if the received F1 frame is using a PCA line or not and the flag F2 corresponding to the add side node in the tables 32 and 32'.

When the result of the comparison is that there is no match (F1 does not equal F2), the path-AIS is generated. Referring to FIG. 2 and FIG. 7, (i) a low order group equipment under for example a node (C) 12 receiving a service by the PCA line, receives the output of the path-AIS from the path-AIS generation means 34', in the case of an erroneous connection resulting in switching to a service by a working line provided to another subscriber and (ii) a low order group equipment under for example a node (C) 12 receiving a service by the working line, receives the output of the path-AIS from the path-AIS generation means 34, in the case of an erroneous connection resulting in switching to a service by a PCA line provided to another subscriber.

In the above-mentioned way, the writing and reading of the flag F1 are performed with respect to the Z4 byte or Z5 byte (if necessary both) constituting the path overhead bytes, but referring to the example of FIG. 6 explained above, the flag F1 is written at the first bit B1 of the Z5 byte. The flag F1 is either on or off, so 1 bit is sufficient. That is, one bit among the eight bits constituting the Z4 byte or the Z5 byte is used to indicate the flag showing if the PCA line is in use or not.

Referring now to FIG. 6, it is also possible to include in the remaining seven bits B2 to B8 among the eight bits constituting the Z5 byte (or Z4 byte) information indicating the time slot numbers #25 to #48 (in the case of an OC-48 transmission mode) in the protection line (path P) used by the PCA line.

When the TSI malfunctions and drops a time slot which should not be dropped (one of #25 to #48), the malfunction can be detected by matching with the bits B2 to B8.

According to the configuration of the present invention, it is possible to easily cope with installation of additional lines.

Figure 8:
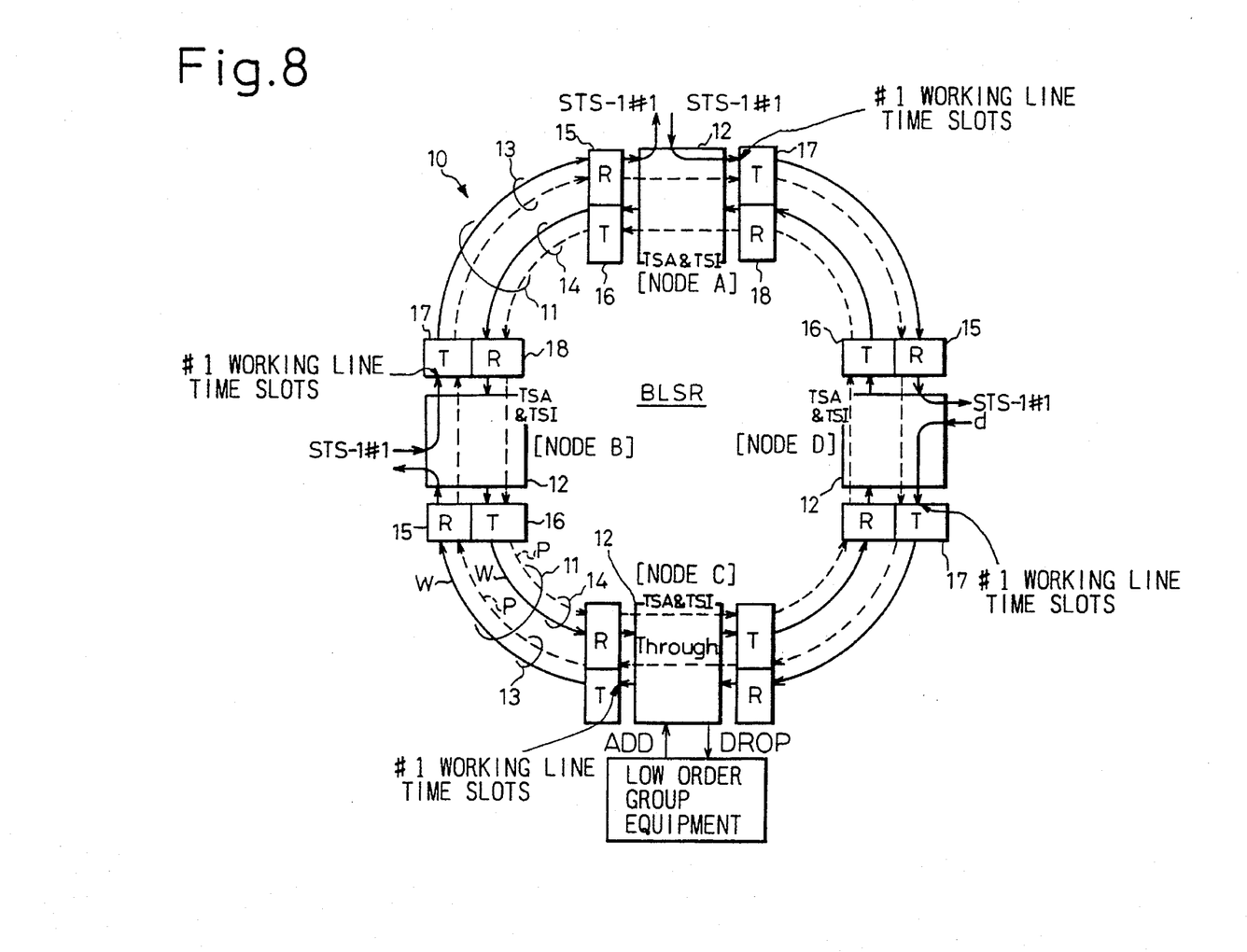
FIG. 8 is a view for explaining the installation of additional lines.

FIG. 8 is a view for explaining the installation of additional lines. In the figure, assume that the node (C) 12 is a through node. Accordingly, here, the data of all the time slots passes through.

Assume however that on a later date there is a request from a user to connect the node (C) 12 to low order group equipment. If this is done, then the node (C) 12 must have not only a through function, but also an add or drop function of the transmission data. Accordingly, it becomes necessary to install another line for the same.

In the past, when installation of an additional line was required, it was necessary first of all to rewrite the channel setting information at all the nodes 12—a considerably complicated undertaking. In the current day BLSR network, a mapping table is provided at each node to enable such installation of additional lines to be dealt with. Each mapping table stores information showing the states of the TSAs etc. in the nodes 12. The information is voluminous and complex and indicates, for example, that the time slot #1 of the node A is to be added, the time slot #5 of the node B is to be passed through, and the data entering the node D at the time slot #23 is to be dropped at the time slot #23.

When installation of an additional line at the node C becomes necessary, the states of the TSAs are rewritten at all the nodes in order to deal with the addition. This, however, is troublesome.

According to the configuration of the present invention explained above, however, this type of mapping table becomes completely unnecessary.

That is, when the plurality of nodes 12 include through nodes for performing through operations only on the channel and a new line is to be set with the low order group equipment accommodated under the through node afterward, it is sufficient to rewrite just the content of the table 32 (or both 32 and 32') of only the node connecting with the through nodes among the other nodes. The table is a simple one just mapping the correspondence of the time slots and node IDs and is a simple matrix table (RAM) constructed by columns of the ID1 to ID16 and rows of #1 to #48, for example. Therefore, rewriting is extremely easy.

As explained above, according to the present invention, it is possible to generate a path-AIS by adding simple hardware to the existing nodes of the BLSR network and by the simple procedure of writing and reading IDs and performing a comparison by comparing means. Since the procedure is simple, the time required until generation of the path-AIS is also greatly shortened.

What is claimed is:

1. A bidirectional line switched ring network having a path alarm identification signal (AIS) generation function, comprising an optical ring transmission line having a bidirectional line switchable bidirectional configuration, allotting each channel to one of the plurality of time slot groups, and transmitting frames for each channel, a plurality of nodes inserted at predetermined intervals on the optical ring transmission line, each accommodating under it a low order group equipment and performing an add or drop operation of frames of the channel between the low order group equipment and the optical ring transmission line, which nodes have the function of generating an alarm indication signal (AIS) when an erroneous channel connection occurs at a working line, converting frames belonging to the channel on which the erroneous connection has occurred to a path alarm indication signal, and sending the same to the low order group equipment, first ID writing means provided at add side nodes of frames for writing, in the path overhead bytes of the frames, IDs preassigned to the add side nodes, first tables provided at drop side nodes of frames for holding a predetermined correspondence between the IDs of add side nodes sending frames to be dropped at drop side nodes and number of time slots to be used for the transmission of the frames, first comparing means provided at drop side nodes of frames for comparing the IDs of add side nodes read from the received path overhead bytes and the IDs of add side nodes in the first tables corresponding to the number of the time slots used by the received frames, and path alarm indication signal generation means for generating and sending to the low order group equipment a path alarm indication signal when the result of the comparison by the first comparing means is that the two IDs do not match.

2. A bidirectional line switched ring network having a path alarm indication signal generation function as set forth in claim 1, wherein the first ID writing means and the first comparing means perform writing and reading of the add side node IDs to and from at least one of the Z4 byte and Z5 byte constituting the path overhead bytes.

3. A bidirectional line switched ring network having a path alarm indication signal generation function as set forth in claim 1, wherein the first ID writing means and the first comparing means perform writing and reading of the add side node IDs using the J1 byte constituting part of the path overhead bytes.

4. A bidirectional line switched ring network having a path alarm indication signal generation function as set forth in claim 2, wherein the nodes are further provided with the function of generating a path alarm indication signal even when a protection channel access (PCA) line executing protection channel access and using the protection line is erroneously switched to a working line by loopback due to occurrence of some failure, provision is made of a protection channel access line side ID writing means and comparing means, which are similar to said first ID writing means and said first comparing means, which means perform writing and reading of the flag showing if the protection channel access line is being used or not to and from at least one of the Z4 byte and Z5 byte constituting the path overhead bytes, the nodes are provided with protection channel access line side tables, similar to said first tables, which tables hold the correspondence between the add side node IDs and flags showing if the add side nodes are using the protection channel access line or not, and the first comparing means compare the flags, read from the overhead POH bytes in the received frames, indicating if the received frames are using the protection channel access line or not and the flags corresponding to the add side node in the tables.

5. A bidirectional line switched ring network having a path alarm indication signal generation function as set forth in claim 1, wherein the plurality of nodes include through nodes for performing only through operations to the lines, the contents of the first tables at the other nodes connecting with the through nodes requiring rewrite when a new line is to be set with low order group equipment accommodated under a through node.

6. A bidirectional line switched ring network having a path alarm indication signal generation function as set forth in claim 2, wherein four consecutive bits among the eight bits constituting the Z4 byte or Z5 byte are used to express information on IDs preassigned to the add side nodes.

7. A bidirectional line switched ring network having a path alarm indication signal generation function as set forth in claim 6, wherein the remaining four bits other than the four consecutive bits are used to send information of the drop side IDs.

8. A bidirectional line switched ring network having a path alarm indication signal generation function as set forth in claim 4, wherein one bit among the eight bits constituting the Z4 byte or Z5 byte is used as a flag, to indicate whether or not the protection channel access line is in use.

9. A bidirectional line switched ring network having a path alarm indication signal generation function as set forth in claim 8, wherein information showing the time slot number in the protection line used by the protection channel access line is included in the seven remaining bits among the eight bits constituting the Z4 byte or Z5 byte.

* * * * *